United States Patent [19]

Nishimura et al.

[11] Patent Number: 4,763,286

[45] Date of Patent: Aug. 9, 1988

[54] MEASURED DATA PASS-FAIL DISCRIMINATING APPARATUS

[75] Inventors: Takeji Nishimura; Hiroshi Koizumi, both of Kawasaki, Japan

[73] Assignee: Mitutoyo Mfg. Co., Ltd., Tokyo, Japan

[21] Appl. No.: 717,272

[22] PCT Filed: Jul. 31, 1984

[86] PCT No.: PCT/JP84/00388

§ 371 Date: Mar. 8, 1985

§ 102(e) Date: Mar. 8, 1985

[87] PCT Pub. No.: WO85/00880

PCT Pub. Date: Feb. 28, 1985

[30] Foreign Application Priority Data

Aug. 4, 1983 [JP] Japan .................. 58-143338

[51] Int. Cl.$^4$ .............................................. G08B 19/00
[52] U.S. Cl. ...................................... 364/352; 340/502; 340/511
[58] Field of Search ............... 364/550, 551, 552, 554; 340/501, 502, 511, 521, 522, 658; 377/24

[56] References Cited

U.S. PATENT DOCUMENTS

| | | | |
|---|---|---|---|
| 4,097,849 | 6/1978 | Taylor | 340/502 |
| 4,368,641 | 1/1983 | McLeod, Jr. | 364/552 X |
| 4,459,749 | 7/1984 | Rieder et al. | 33/125 C |
| 4,562,548 | 12/1985 | Anderson et al. | 340/511 X |
| 4,575,711 | 3/1986 | Suzuki et al. | 340/511 X |
| 4,594,580 | 6/1986 | Nelson | 340/501 X |

FOREIGN PATENT DOCUMENTS

| | | |
|---|---|---|
| G8128698.8 | 3/1982 | Fed. Rep. of Germany. |
| 3135440 | 4/1983 | Fed. Rep. of Germany. |
| 2107046 | 4/1983 | United Kingdom. |

Primary Examiner—Gary V. Harkcom
Assistant Examiner—H. R. Herndon
Attorney, Agent, or Firm—Flynn, Thiel, Boutell & Tanis

[57] ABSTRACT

A measured data pass-fail discriminating apparatus comprising a digital display type measuring instrument (1) and a data discriminating device (2) for discriminating pass or fail of measured data inputted from the measuring instrument (2). In the data discriminating device (2), the upper limit value (HH) and the lower limit value (LL) are set, and the upper limit preview value (H) and the lower limit preview value (L) are set closer to reference values than the upper limit value (HH) and lower limit value (LL). An alarm signal is given when the measured data having the same number as the preset judging frequency (JI) continuously lies in ranges between the upper limit preview value (H) and the upper limit value (HH) and between the lower preview value (L) and the lower limit value (LL), or when the measured data exceed the upper limit value (H) and the lower limit value (L).

8 Claims, 3 Drawing Sheets

MEASURED DATA PASS-FAIL DISCRIMINATING APPARATUS

DESCRIPTION

1. Technical Field

This invention relates to a measured data pass-fail discriminating apparatus.

2. Background Technique

In general, so-called digital display type measuring instruments wherein an encoder is attached to a spindle of a micrometer or the like so as to digitally display and store a measured value, being advantageous in facilitating the reading and requiring no skill level, etc., are utilized in various industrial fields.

However, the digital measuring instrument of the type described has a problem of practical use in the interrelation between the measuring component and the characteristics of the machine tool or a measured object after the working operation.

For example, in a measuring instrument, wherein there are set the upper and lower limit values which are compared with measured data to thereby give an alarm, it is too late when the alarm is given in accordance with one of the set values, with the result that a multitude of defectives are worked on. Or, there have been such disadvantages that, in spite of the sufficient allowable tolerance, alarms are frequently given to thereby interfere with the working operation, and moreover, it is indiscernible if the alarms are caused by other factors such as noises or by true defectives.

Particularly, in an improved measuring instrument, wherein a group of measured data are stored, and processed to seek a standard deviation, etc., whereby the quality control as in a group is performed, an operational circuit and the like cannot avoid the increase in size, the economic burden is heavy, such problems are raised in the operation that difficulties are encountered in making a proper selection between the setting of the number of the group of data and the number of articles to be worked on, and such a disadvantage is presented that it is difficult to apply the measuring instrument to any inspection other than an identical article multipoint inspection.

Here, the present invention has been developed to obviate the above-described disadvantages of the prior art and has as its object the provision of a measured data pass-fail discriminating apparatus being outstanding in reliability, controllability and economics.

DISCLOSURE OF THE INVENTION

In view of the above, the present invention is of such an arrangement that there are provided a measuring instrument for outputting measured data and a data discriminating apparatus for discriminating the measured data as a digital value to give an alarm signal, and the data discriminating apparatus includes: means for storing first limiting values for discriminating pass or fail of a work to be measured, second limiting values set closer to acceptance values than the first limiting values and preview judging frequencies, respectively; and means for discriminating the measured data given by the measuring instrument, giving an alarm signal when the measured data exceeds one of the first limiting values, and giving an alarm signal when the measured data continues to lie within a region between the first limiting values and the second limiting values, and a number of said measured data lying within a one of said regions has a predetermined relation with one of the preview judging frequencies belonging to one of the aforesaid regions.

In short, firstly, one of the technical features of the present invention resides in the adoption of an alarm system. Secondly, another of the technical features resides in the adoption of a two step system including defective judging regions and preview judging regions for previewing defectives to give alarms and suggestions for necessary adjustments to a machine tool. Thirdly, a further one of the technical features resides in that, in the defective judging regions, there are adopted one point discrimination systems, wherein, regardless of whether it is a true defectiveness of a work to be measured or a defective measured data value, an emergency call is given by one of the first limiting values for discriminating pass or fail of the work to be measured, and, in the preview judging regions, there are adopted tolerance value multipoint discrimination systems, wherein, a preview alarm is given when measured data having the same number as the preview judging frequency preset in accordance with a condition of working, for example, continuously belongs to one of the regions between the first limiting values and the second limiting values set closer to the passing values than the first limiting values.

THE MOST PREFERABLE FORM FOR WORKING THE INVENTION

Description will hereunder be given of one embodiment of the present invention with reference to the drawings.

Figure 1:
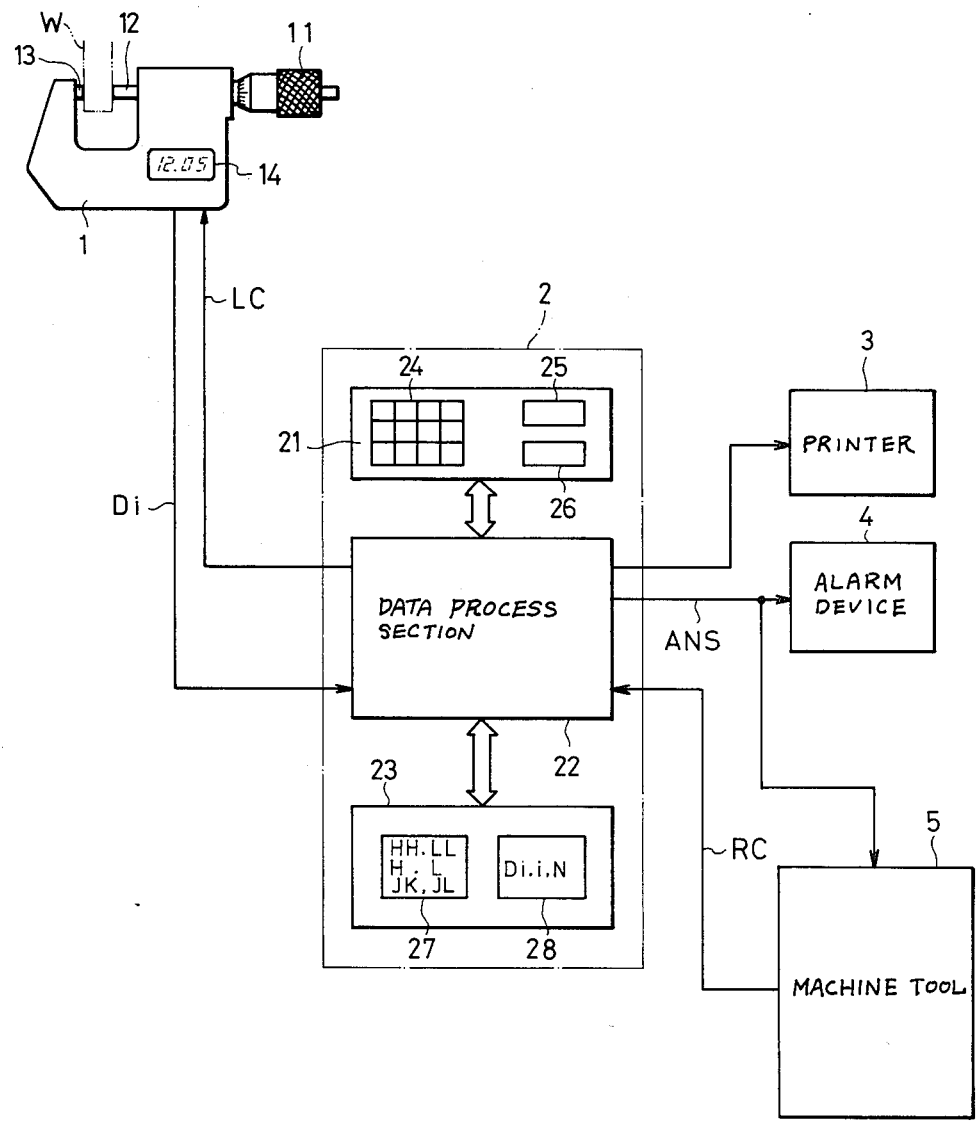
FIG. 1 is a block diagram showing one embodiment of the present invention.

FIG. 1 shows the measured data pass-fail discrimination apparatus of this embodiment. This apparatus comprises: a micrometer 1 as being a measuring instrument; a data discriminating device 2 for discriminating the measured data from this micrometer 1 to give an alarm signal; a printer 3 for printing data given by this data discriminating device 2; and an alarm device 4 actuated in response to an alarm signal from the data discriminating device 2. The micrometer 1 is of such an arrangement that, if a spindle 12 is caused to linearly move to or from an anvil 13 by the rotating operation of a thimble 11, then a movement value of the spindle 12 relative to the anvil 13, i.e. a dimension of a work W is digitally displayed on a digital indicator 14, stored therein, and, when a data transfer command LC is given from the data discriminating device 2, the measured data Di stored therein is transferred to the data discriminating device 2.

Figure 2:
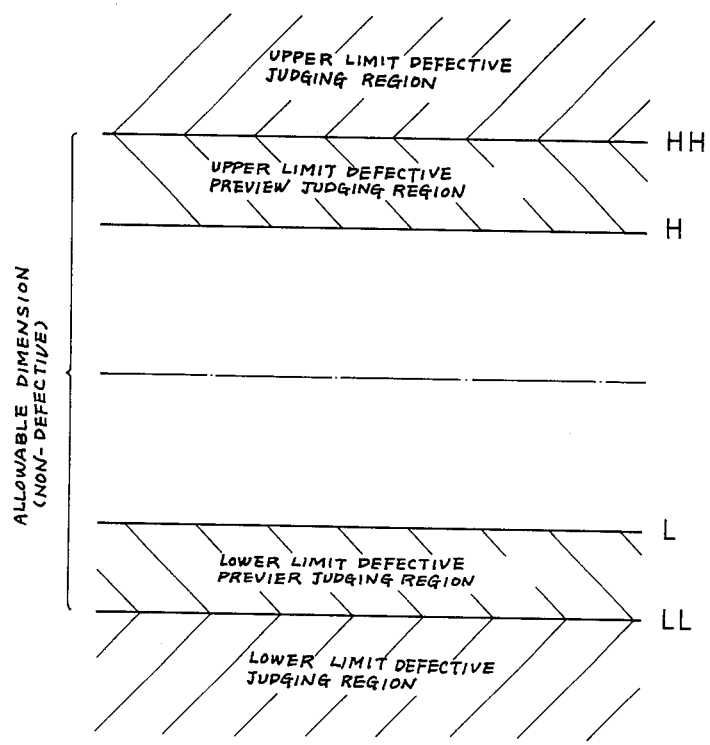
FIG. 2 is an explanatory view showing the regions for discriminating non-defectives from defectives.

The data discriminating device 2 includes a control section 21, a data process section 22 and a storage section 23. In the control section 21, there are provided a set button 24, a reset button 25 and a measured data take-in button 26, respectively. As shown in FIG. 2 for example, through a set button 24, there are inputted an upper preview judging frequency Jh and a lower preview judging frequency Jl, both of which are adapted to output preview alarms, respectively, in addition to an upper limit value HH and a lower limit value LL of allowable dimension as being first limiting values set to a reference dimension of the work W and an upper limit preview value H and a lower limit preview value L as being second limiting values set in between the upper limit value HH and the lower limit value LL. Furthermore, in the storage section 23, there are provided: a set data storage portion 27 for storing various data through the operation of the set button 24 of the control section 21; and a variable data storage portion 28 for successively renewing, storing the measured data Di transferred from the micrometer 1 and storing the number of the measured data i and the number N of the preview judging region data continuously belonging to the preview judging region, respectively.

On the other hand, the data process section 22 causes the set data storage portion 27 to store various data inputted through the set button 24 when the set button 24 is operated, and to release an alarm signal ANS and clear the number of the measured data i and the number N of the preview judging region data, when the reset button 25 is operated. Furthermore, the data process section 22 gives a data transfer command LC to the micrometer 1 when the measured data take-in button 26, causes the variable data storage portion 28 to renew and store the measured data Di transferred from the micrometer 1, counts up the measured data i by +1, thereafter, judges as to which judging region the measured data Di belongs, and operates the printer 3 and the alarm device 4 in accordance with the result of the judgment. In this case, the alarm signal ANS outputted from the data process section 22 to the alarm device 4 is delivered to a machine tool 5 to stop the machine tool 5 in operation. Additionally, when a measured data reading command RC is delivered from the machine tool 5 to the data process section 22, the data process section 22 outputs the measured data transfer command LC to the micrometer 1 in the same manner as with the operation of the measured data take-in button 26.

Figure 3:
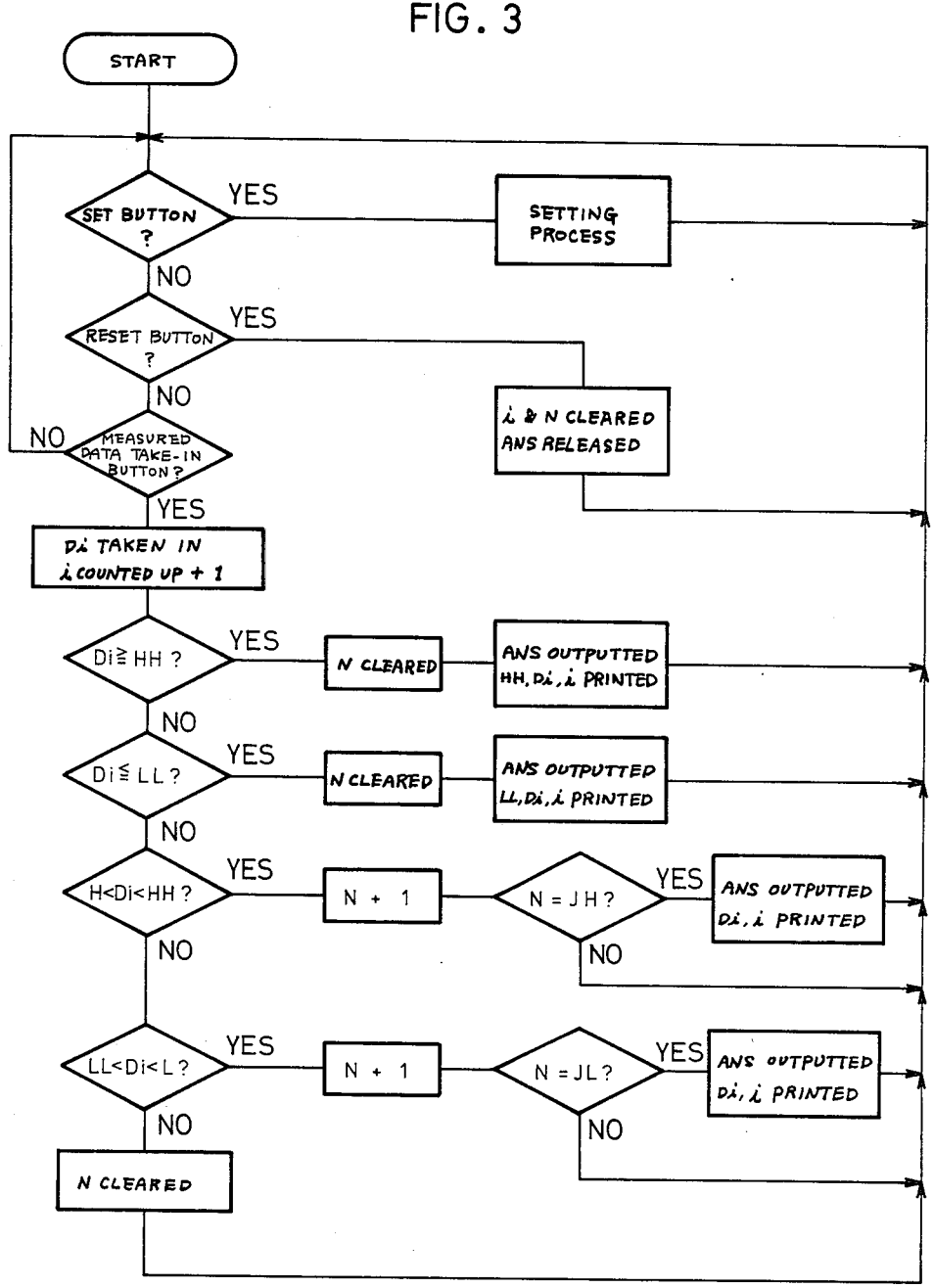
FIG. 3 is a flow chart.

Description will hereunder be given of action of this embodiment with reference to FIG. 3. Firstly, if, through the operation of the set button 24 of the control section 21, there are inputted the upper limit preview judging frequency Jh and the lower limit preview judging frequency Jl, both of which are selected in accordance with the condition of working and the like or the machine tool 5 for example, in addition to the upper limit value HH and the lower limit value of allowable dimension, both of which are set to a reference dimension of the work W, and the upper limit preview value H and the lower limit preview value L, then the above-described data are set and stored in the set data storage portion 27 by the processing in the data process section 22.

Upon completion of this setting operation, the works worked on by the machine tool 5 are measured successively or every several works. In measuring the work, if the spindle 12 is linearly moved by the rotation of the thimble 11 and the work W is clamped between the forward end of the spindle 12 and an end face of the anvil 13, then a movement value of the spindle 12 relative to the anvil 13, i.e. the dimension of the work W is digitally displayed on the digital indicator 14 and stored therein.

Then, if the measured data take-in button is operated in the control section 21 of the data discriminating apparatus every time of the measurement or every several times of measurement, then the data process section 22 gives a data transfer command LC to the micrometer 1, takes in the measured data Di transferred from the micrometer 1, causes the variable data storage portion 28 to renew and store the measured data Di, counts up the number i of the measured data by +1, and thereafter, judges as to whether Di is more than the upper limit value HH. At this time, when the measured data Di is more than the upper limit value HH, i.e. the measured data value Di is within the upper limit defective judging region, the number N of the preview judging region data of the variable data storage portion 28 is cleared, thereafter, the alarm signal ANS is outputted to actuate the alarm device 4 and stop the machine tool 5 in operation, the upper limit value HH of the set data storage portion 27, the measured data Di of the variable data storage portion 28 and the number i of the measured data are transferred to the printer 3 and printed out by the printer 3. In consequence, when even one of the works worked on by the machine tool 5 is a defective exceeding the upper limit value, the working is stopped at the time exceeding the upper limit time, any other defective will not be worked on.

Furthermore, when the measured data Di is not more than the upper limit value HH, judgment is made as to whether the measured data Di is less than the lower limit value LL of the set data storage portion 27 or not. At this time, when the measured data Di is less than the lower limit value LL, i.e. the measured data Di is within the lower limit defective judging region, the number N of the preview judging data of the variable data storage portion 28 is cleared, thereafter, the alarm signal ANS is outputted to actuate the alarm device 4 and stop the machine tool 5 in operation, the lower limit value LL of the set data storage portion 27, the measured data Di of the variable data storage portion 28 and the number i of the measured data are transferred to the printer 3, and printed out by the printer 3. In consequence, when even one of the works worked on by the machine tool 5 is a defective exceeding the lower limit value, the working is stopped at the time of exceeding the lower limit value, any other defective will not be worked on.

Furthermore, when the measured data Di is not less than the lower limit value LL, i.e. the measured data Di is within an allowable dimension range, judgment is made as to whether the measured data Di is within a range between the upper limit value HH and the upper limit preview value H or not. Here, when the measured data Di falls in the range between the upper limit value HH and the upper limit preview value H, i.e. the measured data Di falls in the upper limit defective preview judging region, the number N of the preview judging region data is counted up by +1, and thereafter, judgment is made as to whether the number N of the preview judging region data is equal to the upper limit preview judging frequency Jh or not. When the number N of the preview judging region data N reaches the upper limit preview judging frequency Jh, the alarm signal ANS is outputted, the measured data Di and the number i of the measured data are printed out. However, when the number N of the preview judging region does not reach the upper limit preview judging frequency Jh, a process of detecting the presence of the operation of the control section 21 is repeated. With the above-described arrangement, when the measured data Di successively taken in by the operation of the measured data take-in button 26 continuously lies in the upper limit defective preview judging region, the number N of the preview judging region data is successively counted up, and, when the number N of the preview judging region data reaches the upper limit preview judging frequency Jh, the alarm signal ANS is outputted and the measured data Di and the number i of the measured data are printed out. In consequence, when the measured data Di exceeds the upper limit value HH, it is customary that a plurality of the measured data Di before exceeding the upper limit value HH continuously lies in the upper limit defective preview judging region, so that the machine tool 5 can be adjusted before the measured data Di exceeds the upper limit value HH to produce a defective.

Furthermore, when the measured data Di does not belong to the upper limit defective preview judging region, judgment is made whether the measured data Di falls in the range between the lower limit value LL and the lower limit preview value L or not. Here, when the measured data Di falls in the range between the lower limit value LL and the lower limit preview value L, i.e. the measured data Di falls in the lower limit defective judging region, the number N of the preview judging data is counted up by +1, and thereafter, judgment is made as to whether the number N of the preview judging region data reaches the lower limit preview judging frequency Jl of the set data storage portion 27 or not. When the number N of the preview judging region data reaches the lower limit preview judging frequency Jl, the alarm signal ANS is outputted, and the measured data Di and the number i of the measured data are printed out. However, when the number N of the preview judging region data does not reach the lower limit preview judging frequency Jl, the process of detecting a presence of the operation of the control section 21 is repeated. With the above-described arrangement, when the measured data Di successively inputted by the operation of the measured data take-in button 26 continuously lies in the lower limit defective preview judging region, the number N of the preview judging region data is successively counted up, and, when the number N of the preview judging region data reaches the lower limit preview judging frequency Jl, the alarm signal ANS is outputted, the measured data Di and the number i of the measured data are printed out. In consequence, when the measured data Di exceeds the lower limit value LL, it is customary that a plurality of the measured data Di before exceeding the lower limit value LL continuously lies in the lower limit defective preview judging region, so that the machine tool 5 can be adjusted before the measured data Di exceeds the lower limit value LL to produce a defective.

Furthermore, when the measured data Di does not lie in the lower limit defective judging region, the number N of the preview judging region data is cleared, and thereafter, a process of detecting the presence of the operation of the control section 21 is repeated. In consequence, when the measured data Di are included within the range between the upper limit preview value H and the lower limit preview value L, the printer 3 and the alarm device 4 are not operated at all.

In consequence, according to this embodiment, there are set the upper limit value HH and the lower limit value LL of the allowable dimension set to the reference dimension of the work W. Further, there are set the upper limit preview value H and the lower limit preview value L within the allowable dimension rather than the upper and lower limit values HH and LL, and, when the measured data Di given by the micrometer 1 exceeds the upper limit value HH or the lower limit value LL, the alarm signal ANS is outputted to actuate the alarm device 4 and stop the machine tool 5 in operation. On the other hand, when the measured data Di equals the upper limit preview judging frequency Jh and lie continuously within the range between the upper limit value HH and the lower limit preview value H, and, when the measured data Di equals the lower limit preview judging frequency Jl and lie continuously within the range between the lower limit value LL and the lower limit preview value L, the alarm signal ANS is outputted to actuate the alarm device 4 and stop the machine tool 5 in operation, so that tool replacing or adjustment can be performed before a plurality of defectives are worked on.

Furthermore, the preview alarm is judged by the number of the preview judging frequency Jh or Jl, which has been preset, whereby there is no room for allowing the unreliability of data due to the influence of noise, and the like, so that an accurate alarm can be expected. Moreover, these preview judging frequencies Jh and Jl judge on the basis of the continued measured data Di, so that labor can be saved such that, for example, when data of a non-defective is inserted en route, an alarm is given and the operation is interrupted.

On the other hand, repeating of the above-described cycle makes it possible to put the preview forward. For example, if the preview judging frequencies Jh and Jl are suitably determined on the basis of the cycle time of the machine tool 5, the period of time for cooling the product after the working and the like, then there is eliminated a possibility of including a defective or defectives in the products to be inspected during the processes from the working one to the length measuring one, so that the yield can be improved.

Since the upper limit value HH, the lower limit value LL, the upper limit preview value H and the lower limit preview value L can be desirably set, respectively, the apparatus according to the present invention is applicable to the measurement on process form a dimension of a raw material to a dimension of a non-defective on process in addition to an excessively large dimension from a dimension of a non-defective to a dimension of a defective.

Additionally, the upper limit value HH and the lower limit value LL, or the upper limit preview value H and the lower limit preview value L need not necessarily be symmetrical with the reference dimension of the work W, and either one will do.

Furthermore, the upper limit preview judging frequency Jh and the lower limit preview judging frequency Jl can be desirably set, respectively, in accordance with the cycle time of the machine tool or the like.

Further, in the above embodiment, the measured data of the micrometer 1 has been taken into the data process section 2 by the operation of the measured data take-in button 26. However, for example, the measured data take-in button is provided on the micrometer 1, the measured data of the micrometer 1 may be transferred to the data process section 2 by the operation of this measured data take-in button, or every time pressure of a predetermined value is applied the spindle 12 and the anvil 13. Furthermore, the micrometer has been the digital measuring instrument, however, the invention need not necessarily be limited to this, and an analogue measuring instrument with an A/D converter being provided between the data process section and itself may be used. Further, the alarm signal has been one being outputted when the measured data having the same number as the preview judging frequency continuously belong to the upper limit defective preview judging region or the lower limit defective preview judging region. However, for example, it is possible to output the alarm signal when the measured data become in relation of plus 1 or minus 1 with the preview judging frequency.

As has been described hereinabove, the present invention can provide the measured data pass-fail discriminating apparatus excellent in reliability, controllability and economics.

USABILITY IN INDUSTRIES

The measured data pass-fail discriminating apparatus according to the present invention may be connected to or incorporated in any one of various measuring instrument such as a micrometer and applicable to fields of measurement, in which the measured data of the work is discriminated as to whether the work is included within the range of the allowable dimension or not. With this measured data pass-fail discriminating apparatus, signs of occurrence of a defective out of the range of the allowable dimension may be known in advance by an alarm in particular.

What is claimed is:

1. A measured data pass-fail discriminating apparatus for measuring a work being machined by a machine tool, comprising:
    a measuring instrument for outputting measured data;
    a data discriminating device for discriminating said measured data as digital values to output an alarm signal, said data discriminating device including storing means for storing first limiting values for discriminating pass or fail of said work to be measured at both an upper limit and a lower limit, said upper and lower limits being located on opposite sides of acceptable values for said work, second limiting values on both sides of said acceptable values set closer to said acceptable values than said first upper and lower limit values and preview judging frequencies, respectively, and means for comparing said measured data with said limiting values, means for counting the number of measured data continuously lying within the region between said first limiting values and said second limiting values, means for resetting the number of measured data lying in the region between said first and second limiting values to zero when the measured data lies within an allowable region between said second limiting values, and alarm means for providing an alarm signal when at least one of said measured data exceeds one of said first limiting values, said measured data continues to lie within a region between said first limiting values and said second limiting values and a number of said measured data lying within a one of said regions has a predetermined relation with one of said preview judging frequencies belonging to said one of said regions.

2. A measured data pass-fail discriminating apparatus as set forth in claim 1, wherein said number of said measured data lying within said one of said regions is equal in number to said preview judging frequency.

3. A measured data pass-fail discriminating apparatus as set forth in claim 2, wherein said first limiting value at said upper limit and said first limiting value at said lower limit are provided in symmetry with reference values of the work.

4. A measured data pass-fail discriminating apparatus as set forth in claim 3, wherein said second limiting value at said upper limit and said second limiting value at said lower limit are provided in symmetry with reference values of the work.

5. A measured data pass-fail discriminating apparatus as set forth in claim 1, wherein said data discriminating device further includes means for changeably setting said first limiting values, said second limiting values and said preview judging frequencies.

6. A measured data pass-fail discriminating apparatus as set forth in claim 1, wherein said data discriminating apparatus is connected with a printer for printing out the measured data and the number of the measured data when said alarm signal is given.

7. A measured data pass-fail discriminating apparatus as set forth in claim 1, wherein said data discriminating device includes:
    a control section for setting said first and said second limiting values and said preview judging frequencies;
    a data storage portion, to which the data are inputted by the operation of said control section; and
    a variable data storage portion for renewing and storing said measured data and storing said measured data and the number of the preview judging data continuously lying in a range between said first and said second limiting values.

8. A measured data pass-fail discriminating apparatus as set forth in claim 1, wherein said measuring instrument is a digital display type micrometer.

* * * * *